US012293747B2

(12) United States Patent
Ishihara et al.

(10) Patent No.: US 12,293,747 B2
(45) Date of Patent: May 6, 2025

(54) MUSICAL INSTRUMENT

(71) Applicant: YAMAHA CORPORATION, Hamamatsu (JP)

(72) Inventors: Yasuhito Ishihara, Hamamatsu (JP); Jun Ishii, Hamamatsu (JP); Hidehisa Yasuno, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 476 days.

(21) Appl. No.: 17/860,158

(22) Filed: Jul. 8, 2022

(65) Prior Publication Data

US 2023/0026122 A1 Jan. 26, 2023

(30) Foreign Application Priority Data

Jul. 13, 2021 (JP) ................................ 2021-115782
Jun. 24, 2022 (JP) ................................ 2022-101776

(51) Int. Cl.

*G10H 1/045* (2006.01)
*G10D 1/08* (2006.01)
*G10H 3/14* (2006.01)
*G10H 3/18* (2006.01)

(52) U.S. Cl.

CPC ............... *G10H 1/045* (2013.01); *G10D 1/08* (2013.01); *G10H 3/146* (2013.01); *G10H 3/181* (2013.01); *G10H 3/185* (2013.01)

(58) Field of Classification Search

CPC ........ G10H 1/045; G10H 3/146; G10H 3/181; G10H 3/185; G10D 1/08
See application file for complete search history.

(56) References Cited

U.S. PATENT DOCUMENTS

2017/0125001 A1* 5/2017 Ohnishi .................. G10D 3/02
2017/0206881 A1* 7/2017 Ekuni ..................... G10D 1/08

FOREIGN PATENT DOCUMENTS

JP 6524927 B2 6/2019

* cited by examiner

*Primary Examiner* — Dedei K Hammond
*Assistant Examiner* — Philip G Scoles
(74) *Attorney, Agent, or Firm* — ROSSI, KIMMS & McDOWELL LLP

(57) ABSTRACT

A musical instrument includes: an acoustic portion that makes sound in response to vibration; an exciter that includes an exciter body and a vibrating portion vibrating with respect to the exciter body, and excites the acoustic portion; and a support portion that is attached to the acoustic portion and supports the exciter body such that the vibration is transmitted from the vibrating portion to the acoustic portion. The support portion supports the exciter body such that the exciter body is elastically displaced with respect to the acoustic portion. A resonance frequency of a vibration system including the exciter body and the support portion is lower than the lowest resonance frequency of the acoustic portion.

10 Claims, 4 Drawing Sheets

MUSICAL INSTRUMENT

CROSS-REFERENCE TO RELATED APPLICATIONS

The present application claims the benefit of priority to Japanese Patent Application No. 2021-115782, filed Jul. 13, 2021, and Japanese Patent Application No. 2022-101776, filed Jun. 24, 2022. The content of these applications is incorporated herein by reference.

BACKGROUND

The present disclosure relates to a musical instrument.

Conventionally, there is a musical instrument that excites a soundboard or the like with an exciter to emit sound.

SUMMARY

An object of the present disclosure is to provide a musical instrument in which a change in frequency characteristics of sound emitted from an acoustic portion can be suppressed even when an exciter is attached to the acoustic portion.

One aspect of the present disclosure is a musical instrument including: an acoustic portion that makes sound in response to vibration; an exciter that includes an exciter body and a vibrating portion vibrating with respect to the exciter body and that excites the acoustic portion; and a support portion that is attached to the acoustic portion and supports the exciter body such that the vibration is transmitted from the vibrating portion to the acoustic portion, in which the support portion supports the exciter body such that the exciter body is elastically displaced with respect to the acoustic portion, and a resonance frequency of a vibration system including the exciter body and the support portion is lower than the lowest resonance frequency of the acoustic portion.

DESCRIPTION OF EMBODIMENTS

When an exciter having a predetermined weight is attached to an acoustic portion that makes sound in response to vibration, such as a back plate of an acoustic guitar, vibration characteristics of the acoustic portion are affected by a weight of the exciter. For this reason, the vibration characteristics of the acoustic portion ends up being different from vibration characteristics when the exciter is not attached. That is, there is a problem in which frequency characteristics (acoustic characteristics of a musical instrument) of the sound emitted from the acoustic portion due to the vibration changes depending on presence or absence of the exciter.

First Embodiment

A first embodiment of the present disclosure will be described below with reference to FIGS. 1 to 4.

Figure 1:
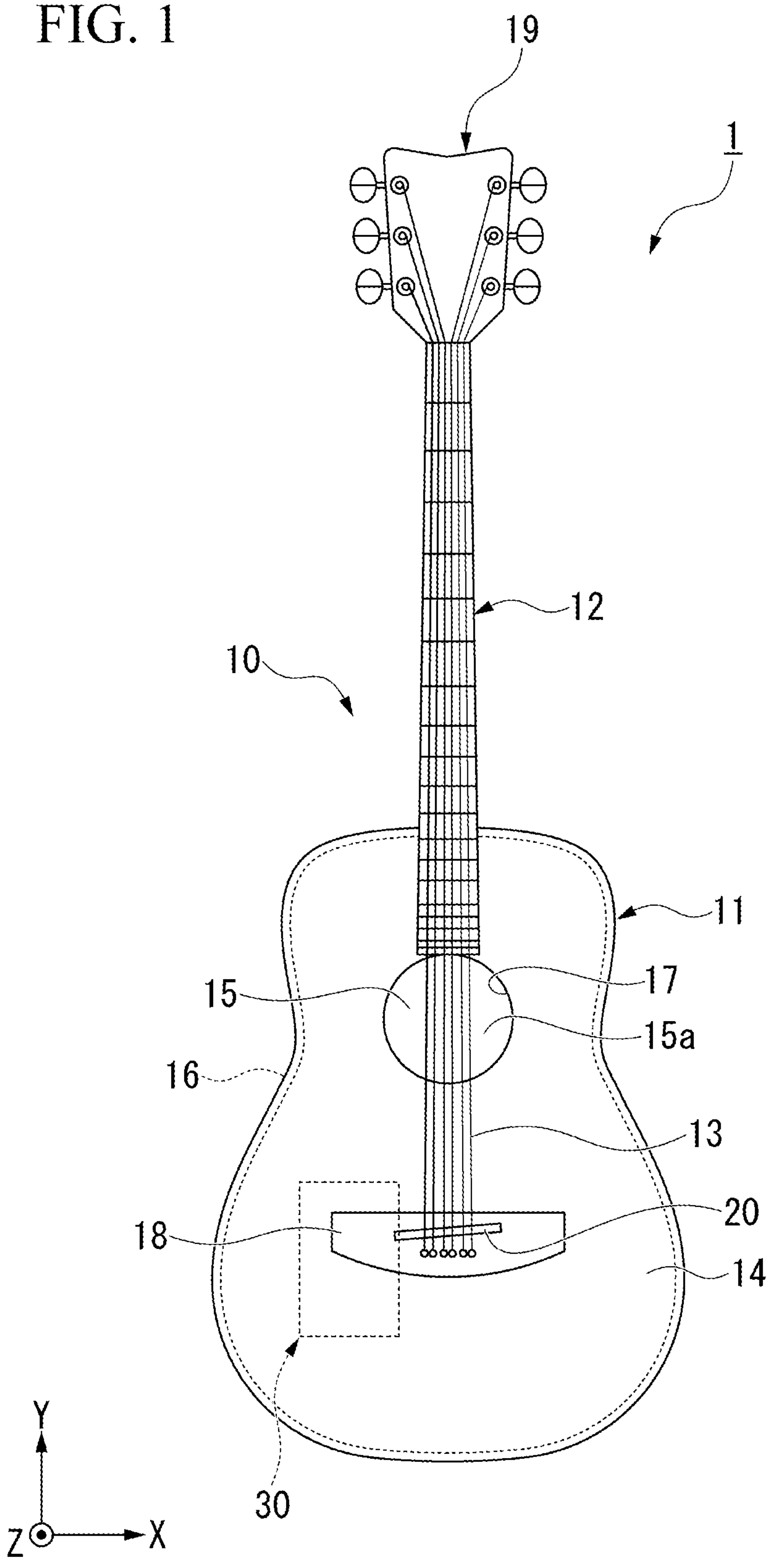
FIG. 1 is a front view illustrating an inventive guitar according to a first embodiment.

As illustrated in FIG. 1, a musical instrument according to the present embodiment is an acoustic guitar 1 (hereinafter, simply referred to as guitar 1). The guitar 1 includes a guitar body 10 (a musical instrument body) and an exciting device 30. The guitar body 10 includes a body 11, a neck 12, and strings 13.

The body 11 is formed in a box shape having a cavity inside. The body 11 has a front plate 14, a back plate 15, and a side plate 16. The front plate 14 and the back plate 15 are flat plates each having the same shape as the shape of the other. The front plate 14 and the back plate 15 are arranged at an interval in a plate thickness direction of said plates. The side plate 16 extends from a circumferential edge of the back plate 15 to a circumferential edge of the front plate 14. The front plate 14, the back plate 15, and the side plate 16 constitute the body 11 having the cavity inside. In the following description, a direction in which the front plate 14 and the back plate 15 are arranged (a Z axis direction) may be referred to as a vertical direction.

A sound hole 17 penetrating in the plate thickness direction of the front plate 14 is formed in the front plate 14. The sound hole 17 connects the cavity of the body 11 to a space outside the body 11. Further, a bridge 18 that fastens first ends in a longitudinal direction of the strings 13 is provided on an outer surface of the front plate 14.

The neck 12 extends from the body 11 in a direction substantially orthogonal to the vertical direction (Z axis direction). A head 19 for winding second end sides of the strings 13 in the longitudinal direction is provided at a distal end of the neck 12. In the following description, a direction orthogonal to the vertical direction and in which the neck 12 mainly extends (a Y axis direction) may be referred to as a front to rear direction. Further, a direction orthogonal to the vertical direction and the front to rear direction may be referred to as a left to right direction (an X axis direction).

The strings 13 are stretched over the body 11 and the neck 12 in the front to rear direction. Specifically, the first ends of the strings 13 are fastened to the bridge 18 of the body 11, and the second end sides of the strings 13 are wound up at the head 19. Thus, the strings 13 are stretched between the bridge 18 and the head 19.

A vibration transmission portion 20 (a saddle) is provided between the strings 13 and the outer surface of the front plate 14. Thus, in the guitar 1, vibration of the strings 13 is transmitted to the front plate 14 via the vibration transmission portion 20, and thereby the front plate 14 vibrates and the back plate 15 and the side plates 16 also vibrate. As a result, air inside the body 11 (cavity) resonates, and sound is emitted to the outside of the body 11.

Figure 2:
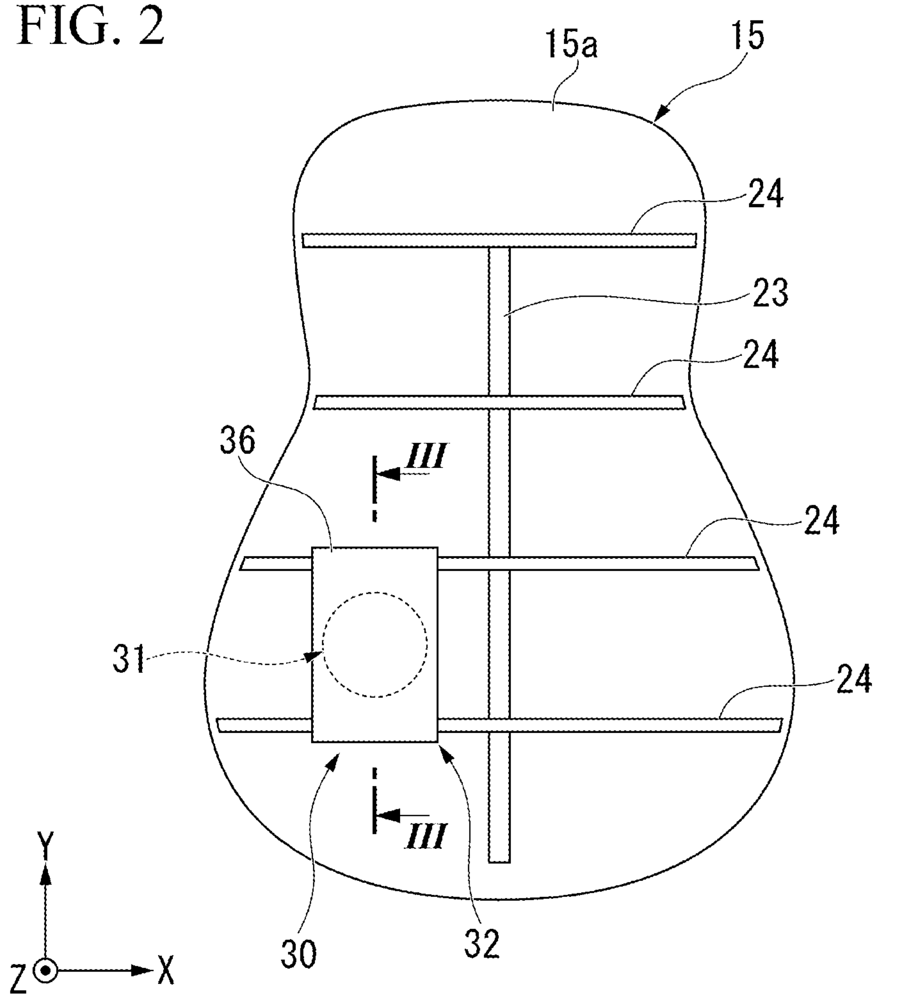
FIG. 2 is a plan view illustrating an inner portion of a back plate of a body in the guitar of FIG. 1.

The back plate 15 of the body 11 has an inner surface **15*a* that faces the front plate 14 in the vertical direction. As illustrated in FIG. 2, a peeling stopper 23 and four sound bars 24 are attached to the inner surface 15*a* of the back plate 15. The peeling stopper 23 and the sound bars 24 are fixed to the inner surface 15*a* at predetermined positions by adhesion or the like. Shapes, numbers, positions, and the like of the peeling stopper 23 and the sound bars 24 illustrated in FIG. 2 are examples, and the positions or the like may be appropriately modified for the purpose of increasing rigidity of the back plate 15, the purpose of adjusting tone colors of the guitar 1**, or the like.

In FIG. 2, the peeling stopper 23 is formed in a strip shape extending along the inner surface 15*a*. The peeling stopper 23 is disposed at a central portion of the inner surface 15*a* of the back plate 15 in the left to right direction so that a longitudinal direction thereof is oriented in the front to rear direction. The peeling stopper 23 prevents peeling of adhesion of the back plate 15 formed by causing two plate materials to adhere to each other at a center in the left to right direction.

Each of the four sound bars 24 is formed in a bar shape extending along the inner surface 15*a*. Each of the sound bars 24 is disposed such that the longitudinal direction is oriented in the left to right direction. The four sound bars 24 are arranged at intervals in the front to rear direction. Portions of the back plate 15 that are provided with the sound bars 24 have higher rigidity than other portions of the back plate 15. For this reason, the portions of the back plate 15 at which the sound bars 24 are provided are less prone to vibration than other portions of the back plate 15, and are highly likely to become vibration nodes.

Figure 3:
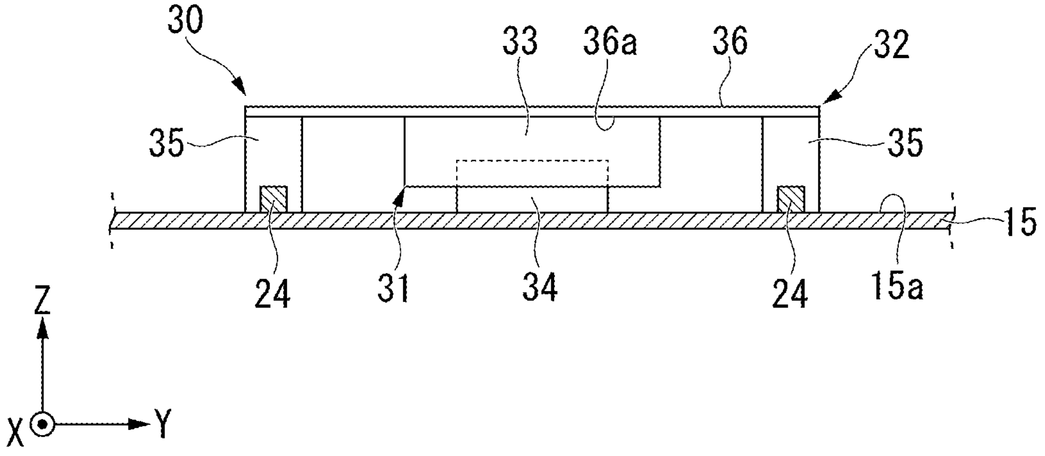
FIG. 3 is a cross-sectional view along line III-III in FIG. 2.

As illustrated in FIG. 3, the exciting device 30 includes an exciter 31 and a support portion 32. The exciter 31 excites the back plate 15 of the body 11 described above. The exciter 31 includes an exciter body 33 and a vibrating portion 34 that vibrates in one direction with respect to the exciter body 33. The exciter 31 is connected to an output device (not illustrated). The exciter 31 may be connected to the output device by wire, or may be wirelessly connected to the output device such that a wireless unit provided in the exciter 31 receives a signal from the output device. The output device stores music data and acoustic and audio data, and outputs an excitation signal (an electrical signal) based on the data. The output device outputs the excitation signal and the exciter 31 receives the excitation signal, and thereby the vibrating portion 34 vibrates with respect to the exciter body 33 on the basis of the excitation signal. The exciter 31 may be, for example, a voice coil type actuator. In this case, the exciter body 33 may have a magnetic body portion, and the vibrating portion 34 may have a voice coil. A weight of the exciter body 33 is sufficiently heavier than a weight of the vibrating portion 34. Thereby, the vibrating portion 34 can be vibrated with respect to the exciter body 33.

The support portion 32 is interposed between the back plate 15 and the exciter body 33. The support portion 32 is attached to the inner surface 15*a* of the back plate 15. The support portion 32 supports the exciter body 33 such that the vibrating portion 34 is in contact with the inner surface 15*a* of the back plate 15, and such that the exciter body 33 is elastically displaced with respect to the back plate 15. A specific configuration of the support portion 32 will be described below.

The support portion 32 includes support legs 35 and a bracket 36. The support legs 35 extend upward (in a positive Z axis direction) from the inner surface 15*a* of the back plate 15. In the present embodiment, two support legs 35 are each fixed to two sound bars 24 adjacent to each other in the front to rear direction on the inner surface 15*a* of the back plate 15. The support legs 35 may be fixed to the sound bars 24 with an adhesive (not illustrated) or the like.

The bracket 36 is a member that fixes the exciter body 33. The bracket 36 is formed in a plate shape or a sheet shape with the vertical direction defined as a thickness direction. The bracket 36 is provided at distal ends of the support legs 35. Specifically, edge portions of the bracket 36 are supported by the support legs 35. Thereby, the bracket 36 is disposed so as to have an interval with respect to the inner surface 15*a* of the back plate 15 in the vertical direction. The bracket 36 may be fixed to the distal ends of the support legs 35 with screws, an adhesive (not illustrated), or the like.

The exciter body 33 is fixed to a facing surface 36*a* side of the bracket 36 that faces the inner surface 15*a* of the back plate 15. The exciter body 33 may be fixed to the bracket 36 with screws, an adhesive (not illustrated), or the like. In a state in which the exciter body 33 is fixed to the bracket 36, the vibrating portion 34 comes into contact with the inner surface 15*a* of the back plate 15. In fact, the vibrating portion 34 is fixed to the inner surface 15*a* of the back plate 15 by adhesion or the like.

In the guitar 1 of the present embodiment configured as described above, when the exciter 31 receives the excitation signal (electrical signal) output from the output device (not illustrated), the vibrating portion 34 vibrates in the vertical direction with respect to the exciter body 33. Thus, the back plate 15 vibrates in the vertical direction, and the vibration of the exciter 31 is converted into acoustic emission. In the present embodiment, the back plate 15 is configured as an acoustic portion that makes sound in response to the vibration.

The support portion 32 is configured such that a resonance frequency of a vibration system including the support portion 32 and the exciter body 33 is lower than a resonance frequency of the back plate 15. “Resonance frequency” may be expressed as a natural frequency or a frequency at which the vibration peaks.

In the present embodiment, the bracket 36 of the support portion 32 is flexible. That is, the bracket 36 is easily deformed. In order for the bracket 36 to be flexible, for example, a thickness of the bracket 36 may be set to be thin (for example, 1 mm or less). A material constituting the bracket 36 may be resin, metal, or the like. Further, the bracket 36 is more easily deformed than the support legs 35; that is, the rigidity of the bracket 36 is lower than the rigidity of the support legs 35.

By adopting the flexible bracket 36 as a constituent element of the support portion 32, the resonance frequency of the vibration system including the support portion 32 and the exciter body 33 is made lower than the resonance frequency of the back plate 15. Further, since the bracket 36 is flexible, the exciter body 33 fixed to the bracket 36 can be elastically displaced with respect to the back plate 15.

Figure 4:
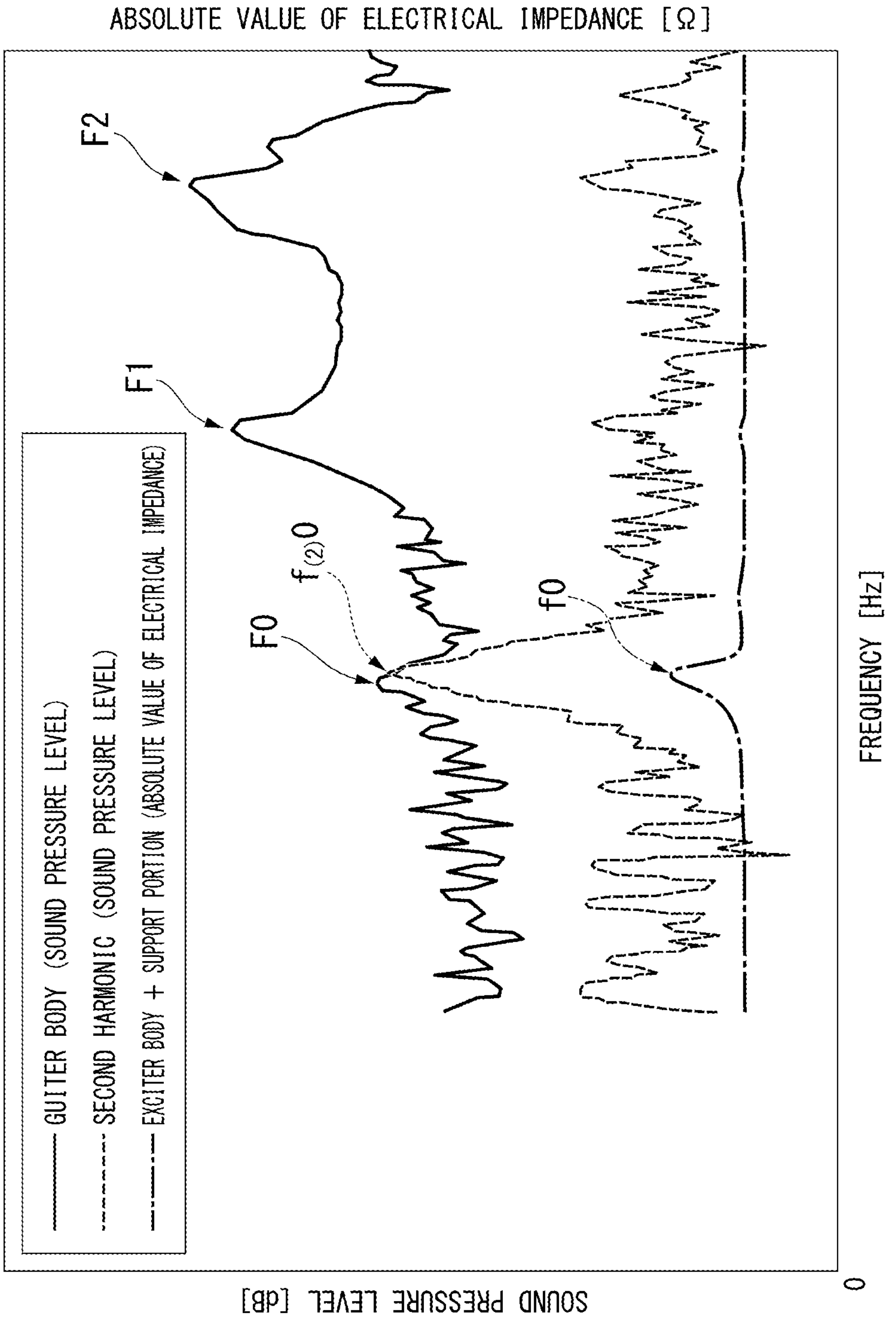
FIG. 4 is a graph illustrating an example of frequency characteristics of an inventive guitar body (the back plate) and frequency characteristics of a vibration system including an exciter body and a support portion in the guitar of FIGS. 1 to 3.

The resonance frequency of the vibration system including the support portion 32 and the exciter body 33 being lower than the resonance frequency of the back plate 15 will be described with reference to FIG. 4. The graph of FIG. 4 illustrates an example of frequency characteristics of the guitar body 10 and frequency characteristics of the vibration system including the support portion 32 and the exciter body 33 of the present embodiment.

The frequency characteristics of the guitar body 10 are measured, for example, in the following manner. First, in an anechoic chamber, the guitar body 10 is hung with the head 19 oriented upward, and a microphone for measuring sound (a sound pressure level) generated from the guitar body 10 is installed near the sound hole 17 of the body 11. In this state, vibration signals of various frequencies are input to the actuator attached to the back plate 15, and the frequency characteristics of the guitar body 10 are measured on the basis of the sound pressure level of the guitar body 10, acquired by the microphone. On this occasion, second harmonic may be measured at the same time. The actuator used here may be, for example, the exciting device 30 of the present embodiment.

In the frequency characteristics of the guitar body 10 measured as described above, as illustrated in FIG. 4, a primary resonance frequency F1 and a secondary resonance frequency F2 having a frequency higher than the primary resonance frequency F1 appear. Also, in the frequency characteristics of the guitar body 10, a resonance frequency F0 having a frequency lower than the primary resonance frequency F1 appears, but the resonance frequency F0 is a peak frequency due to resonance of the actuator and is not included in the frequency characteristics of the guitar body 10. In addition, since vibrations of the front plate 14 and of the back plate 15 are main parts of the vibration of the guitar body 10, the frequency characteristic of the guitar body 10 may be regarded as substantially the same as the frequency characteristics of the back plate 15.

The frequency characteristics of the vibration system including the support portion 32 and the exciter body 33 may be measured in the following manner, for example. First, the exciting device 30 including the support portion 32 and the exciter body 33 is attached to the back plate 15 of the guitar body 10 as illustrated in FIG. 3. Next, with the guitar body 10 hung, vibration signals of various frequencies are input to the exciter 31 of the exciting device 30 to vibrate the vibrating portion 34 and the back plate 15. In this state, an absolute value [Ω] of an electrical impedance of a structure including the support portion 32 and the exciter body 33 is measured by an impedance analyzer. The frequency characteristic of the vibration system including the support portion 32 and the exciter body 33 illustrated in FIG. 4 is shown by data of the absolute value [Ω] of the measured electrical impedance.

In the frequency characteristics of the vibration system including the support portion 32 and the exciter body 33 obtained as described above, the resonance frequency f0 is lower than the primary resonance frequency F1 of the guitar body 10 (back plate 15).

As described above, in the guitar 1 of the present embodiment, the resonance frequency of the vibration system including the exciter body 33 and the support portion 32 is lower than the lowest resonance frequency (primary resonance frequency F1) of the back plate 15 (acoustic portion). Thus, even when the back plate 15 vibrates at its resonance frequency, it is possible to suppress the exciter 31 from following the vibration of the back plate 15. That is, it is possible to reduce the vibration characteristics of the back plate 15 from being affected by the weight of the exciter 31 (particularly the exciter body 33). Accordingly, even when the exciter 31 is attached to the back plate 15, it is possible to suppress a change in frequency characteristics of the sound emitted from the back plate 15.

Further, in the guitar 1 of the present embodiment, the support portion 32 has the support legs 35 extending from the back plate 15 and the bracket 36 provided at the tips of the support legs 35 to fix the exciter body 33. In addition, the bracket 36 is flexible. Since the bracket 36 is flexible, the rigidity of the bracket 36 can be suppressed to a low level. By lowering the rigidity of the bracket 36, the resonance frequency of the vibration system including the exciter body 33 and the support portion 32 can be surely lowered.

Moreover, according to the guitar 1 of the present embodiment, the support legs 35 of the support portion 32 are fixed to the portions of the back plate 15 at which the sound bars 24 are provided. Thus, it is possible to suppress a change in vibration characteristics of the back plate 15 with the installation of the support portion 32 for the back plate 15.

Second Embodiment

Next, a second embodiment of the present disclosure will be described mainly with reference to FIGS. 5 and 6. In the second embodiment, the same constituent elements as those in the first embodiment will be denoted by the same reference numerals, and the description thereof will be omitted.

Figure 5:
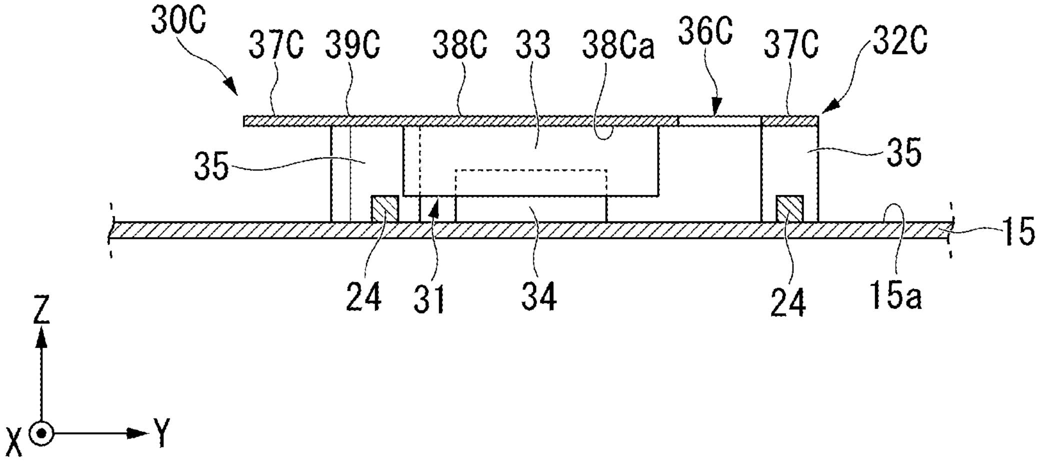
FIG. 5 is a cross-sectional view illustrating a main portion of an inventive guitar according to a second embodiment.

A guitar of the second embodiment includes the guitar body 10 and an exciting device 30C illustrated in FIG. 5, similarly to the guitar 1 of the first embodiment illustrated in FIG. 1. As illustrated in FIG. 5, a support portion 32C of the exciting device 30C of the second embodiment includes a plurality of support legs 35 and a bracket 36C, similarly to the first embodiment. However, the bracket 36C of the second embodiment functions as an elastic portion that elastically deforms so that the back plate 15 and the exciter body 33 are displaced relative to each other in a vibration direction (the Z axis direction) of the exciter 31. A specific configuration of the bracket 36C will be described below.

Similarly to the first embodiment, the bracket 36C is formed in a plate shape or a sheet shape with the vertical direction (Z axis direction) defined as a thickness direction thereof. As illustrated in FIG. 6, the bracket 36C has an outer circumferential portion 37C, an inner circumferential portion 38C, and arm portions 39C.

The outer circumferential portion 37C is formed in an annular shape (a ring shape in FIG. 6) when viewed from the thickness direction (Z axis direction) of the bracket 36C. The plurality of support legs 35 (three support legs in FIG. 6) are attached to the outer circumferential portion 37C and are arranged at intervals in a circumferential direction of the outer circumferential portion 37C.

The inner circumferential portion 38C is disposed to have an interval with and inside the outer circumferential portion 37C. In FIG. 6, the inner circumferential portion 38C is formed in a circular shape, but the present disclosure is not limited thereto. The arm portions 39C are formed to be elastically extendable and contractible and connects the outer circumferential portion 37C to the inner circumferential portion 38C. A plurality of arm portions 39C (three arm portions in FIG. 6) are arranged at intervals in the circumferential direction of the outer circumferential portion 37C and the inner circumferential portion 38C. Thus, the inner circumferential portion 38C can be elastically displaced with respect to the outer circumferential portion 37C in the thickness direction (Z axis direction) of the bracket 36C.

Figure 6:
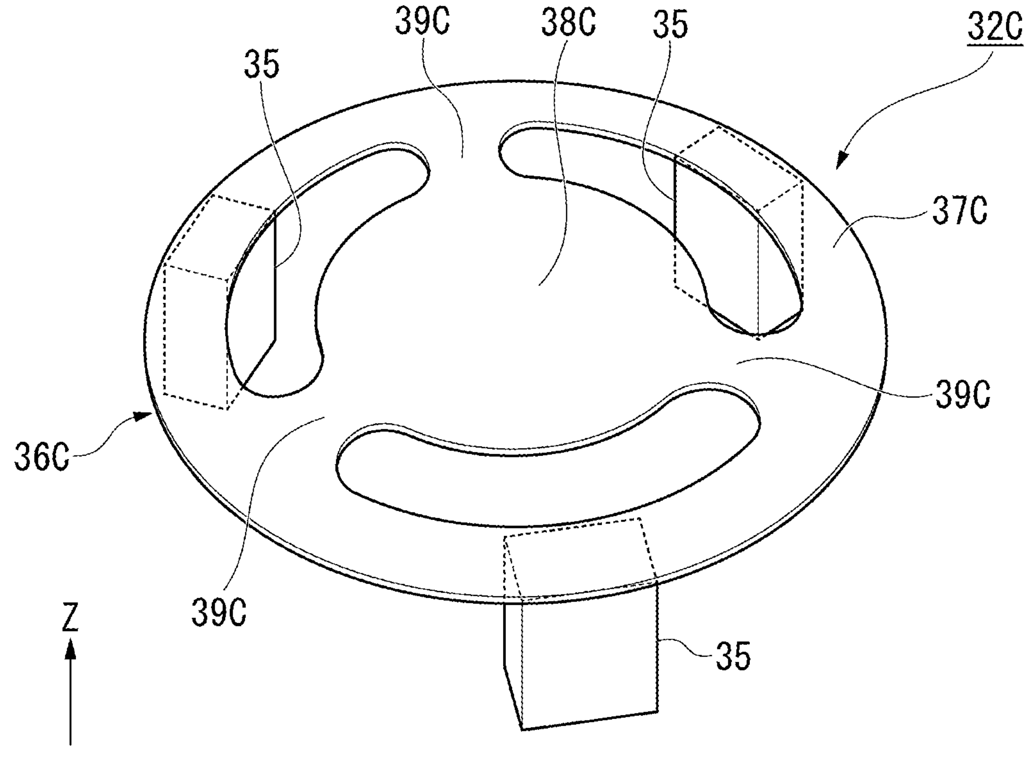
FIG. 6 is a perspective view illustrating a support portion in FIG. 5.

In the support portion 32C in FIG. 6, the support legs 35 and the arm portions 39C are arranged at positions displaced from each other in the circumferential direction of the outer circumferential portion 37C, but may be arranged at the same position in the circumferential direction, for example.

As illustrated in FIG. 5, the support portion 32C of the second embodiment is attached to the back plate 15 such that the bracket 36C (particularly the inner circumferential portion 38C) faces the inner surface 15*a* of the back plate 15 in the vertical direction. The exciter body 33 is fixed to the facing surface 38Ca side of the inner circumferential portion 38C that faces the back plate 15. In the state in which the exciter body 33 is fixed to the inner circumferential portion 38C, the vibration direction of the exciter 31 is oriented in the vertical direction. Thus, by elastically deforming the arm portions 39C, the inner circumferential portion 38C of the bracket 36C and the exciter body 33 can be elastically displaced with respect to the back plate 15 in the vibration direction of the exciter 31.

In the second embodiment, the bracket 36C of the support portion 32C functions as the elastic portion, and thus the resonance frequency of the vibration system including the support portion 32C and the exciter body 33 becomes lower than the resonance frequency of the back plate 15.

According to the guitar of the second embodiment, the same effects as the effects of the first embodiment are achieved.

Further, according to the guitar of the second embodiment, the support portion 32C includes the elastic portion that elastically displaces the exciter body 33 with respect to the back plate 15 in the vibration direction of the exciter 31, so that the resonance frequency of the vibration system including the exciter body 33 and the support portion 32C can be surely made lower than the lowest resonance frequency (primary resonance frequency F1) of the back plate 15.

In the second embodiment, the elastic portion of the support portion 32C may be, for example, an adhesive (not illustrated) for the support portion 32C that is elastically expandable and contractable. The adhesive for the support portion 32C may be, for example, an adhesive that allows the support legs 35 to adhere to the back plate 15 or the sound bars 24, an adhesive that allows the tips of the support legs 35 to adhere to the bracket 36C, and an adhesive that allows the bracket 36C to adhere to the exciter body 33. In this case, the exciter body 33 can be elastically displaced with respect to the back plate 15 in the vibration direction of the exciter 31 due to the elastic expansion and contraction of the adhesive.

Although the present disclosure has been described in detail above, the present disclosure is not limited to the above embodiments, and various modifications can be made without departing from the spirit of the present disclosure.

In the present disclosure, for example, the vibrating portion 34 of the exciter 31 may not come into contact with the back plate 15 and may be provided at least such that the vibration is transmitted from the vibrating portion 34 to the back plate 15.

In the present disclosure, the guitar may be, for example, an electric acoustic guitar. In this case, the guitar may be configured to input, for example, vibrations of the strings 13 converted into electrical signals by a pickup into the exciter 31 of the exciting devices 30 and 30C, thereby vibrating the back plate 15.

The musical instrument of the present disclosure is not limited to a guitar, but may be another stringed instrument, a piano, a percussion instrument, or the like. The acoustic portion of the present disclosure may be, for example, a soundboard of a piano, a head (membrane) of a drum, or the like, which emits sound in response to vibration.

According to the present disclosure, even when the exciter is attached to the acoustic portion, it is possible to suppress a change in frequency characteristics of the sound emitted from the acoustic portion.

What is claimed is:

1. A musical instrument comprising:

an acoustic portion that makes sound in response to vibration;

an exciter that includes an exciter body and a vibrating portion configured to vibrate with respect to the exciter body and configured to excite the acoustic portion; and a support portion that is attached to the acoustic portion and supports the exciter body such that vibration is transmitted from the vibrating portion to the acoustic portion, wherein the support portion supports the exciter body such that the exciter body is elastically displaced with respect to the acoustic portion, the support portion includes a support leg extending from the acoustic portion and a bracket fixed to the support leg and to the exciter body, and a rigidity of the bracket fixed to the support leg and to the exciter body and is less than a rigidity of the support leg extending from the acoustic portion.

2. The musical instrument according to claim 1, wherein the bracket is disposed at a distal end of the support leg.

3. The musical instrument according to claim 1, wherein the exciter body and the acoustic portion are displaced relative to each other in a vibration direction of the exciter.

4. The musical instrument according to claim 1, wherein the bracket is fixed to the support leg and to the exciter body by an adhesive.

5. The musical instrument according to claim 1, wherein a resonance frequency of a vibration system including the exciter body and the support portion is lower than the lowest resonance frequency of the acoustic portion.

6. The musical instrument according to claim 1, wherein the bracket has a polygonal shape.

7. The musical instrument according to claim 1, wherein the bracket has an annular shape.

8. The musical instrument according to claim 7, wherein the bracket includes an annular-shaped outer circumferential portion, a circular-shaped inner circumferential portion disposed inside the annular-shaped outer circumferential portion, and a plurality of openings disposed between the annular-shaped outer circumferential portion and circular-shaped inner circumferential portion.

9. The musical instrument according to claim 8, wherein the annular-shaped outer circumferential portion is connected to the circular-shaped inner circumferential portion by a plurality of arm portions.

10. The musical instrument according to claim 9, wherein the bracket is fixed to a plurality of support legs extending from the acoustic portion with the plurality of support legs and the plurality of arm portions arranged at positions displaced from each other in a circumferential direction of the annular-shaped outer circumferential portion.

* * * * *